US012133821B2

(12) United States Patent
Girardin et al.

(10) Patent No.: US 12,133,821 B2
(45) Date of Patent: Nov. 5, 2024

(54) WHEELCHAIR SECUREMENT SYSTEM AND DEVICE

(71) Applicant: Valeda Company, Oakland Park, FL (US)

(72) Inventors: Jean-Marc Girardin, Fort Lauderdale, FL (US); Joseph Esteireiro, Cambridge (CA); Patrick Girardin, Fort Lauderdale, FL (US)

(73) Assignee: Valeda Company, LLC, Oakland Park, FL (US)

( * ) Notice: Subject to any disclaimer, the term of this patent is extended or adjusted under 35 U.S.C. 154(b) by 655 days.

(21) Appl. No.: 17/147,165

(22) Filed: Jan. 12, 2021

(65) Prior Publication Data

US 2021/0128375 A1    May 6, 2021

Related U.S. Application Data

(63) Continuation of application No. 15/896,024, filed on Feb. 13, 2018, now Pat. No. 10,945,897, which is a continuation of application No. 15/249,265, filed on Aug. 26, 2016, now abandoned, which is a continuation of application No. 14/211,934, filed on Mar. 14, 2014, now Pat. No. 9,445,957.

(60) Provisional application No. 61/798,914, filed on Mar. 15, 2013.

(51) Int. Cl.
*B60P 7/08* (2006.01)
*A61G 3/08* (2006.01)

(52) U.S. Cl.
CPC ............. *A61G 3/0808* (2013.01); *A61G 3/08* (2013.01); *B60P 7/0823* (2013.01)

(58) Field of Classification Search
CPC ........ B60P 7/0823; A61G 3/0808; A61G 3/08
USPC .................... 410/7, 10–12, 21, 23, 100, 103
See application file for complete search history.

(56) References Cited

U.S. PATENT DOCUMENTS 3,888,509 A    6/1975  Willey
4,083,594 A *  4/1978  Tullock ................ A61G 3/0808
                                                               410/4

(Continued)

FOREIGN PATENT DOCUMENTS

EP    3007669 B1    1/2019
GB    2200529 A     8/1988

(Continued)

OTHER PUBLICATIONS

Communication of a notice of opposition to EP2777668.
Extended Search Report dated Feb. 16, 2016 from co-pending EP Application No. 14250043.8 (EP Publ. No. 2777668).

*Primary Examiner* — Stephen T Gordon
(74) *Attorney, Agent, or Firm* — Daniel Tallitsch

(57) ABSTRACT

A mobility aid tie-down securing a mobility aid during transit in a vehicle. The mobility aid tie-down comprises a retractor secured to the vehicle at a first anchor point. The retractor has a spool and a restraint extendable therefrom. The restraint has a first restraint segment extending from the spool to a securement point on the mobility aid and a second restraint segment extending from the securement point on the mobility aid to a second anchor point. The tie-down configuration enables a load from the mobility aid during an adverse driving event to be distributed between the first restraint segment and the second restraint segment.

12 Claims, 4 Drawing Sheets

(56) References Cited

U.S. PATENT DOCUMENTS

| | | | |
|---|---|---|---|
| 4,093,303 A * | 6/1978 | Nelson | A61G 3/0808 410/20 |
| 4,257,644 A | 3/1981 | Stephens | |
| 4,688,843 A | 8/1987 | Hall | |
| 4,842,458 A * | 6/1989 | Carpenter | B60P 7/16 410/103 |
| 4,966,392 A | 10/1990 | Featon et al. | |
| 4,995,775 A | 2/1991 | Gresham | |
| 5,026,225 A | 6/1991 | McIntyre | |
| 5,219,207 A | 6/1993 | Anthony et al. | |
| 5,391,030 A | 2/1995 | Lee | |
| 5,423,644 A | 6/1995 | First, Sr. | |
| 6,113,325 A | 9/2000 | Craft | |
| 6,287,060 B1 | 9/2001 | Girardin | |
| 6,524,041 B1 * | 2/2003 | Voiculescu | B60P 7/083 410/100 |
| 6,899,497 B2 | 5/2005 | Cardona et al. | |
| 7,040,847 B1 | 5/2006 | Cardona | |
| 7,195,433 B2 * | 3/2007 | Cash | B60P 7/083 410/103 |
| 7,717,655 B2 | 5/2010 | Cardona | |
| 8,651,782 B2 * | 2/2014 | Van Roosmalen | A61G 3/08 410/7 |
| 9,445,957 B2 | 9/2016 | Girardin et al. | |
| 10,945,897 B2 * | 3/2021 | Girardin | B60P 7/0823 |
| 2001/0006303 A1 | 7/2001 | Girardin | |
| 2003/0190208 A1 | 10/2003 | Cardona et al. | |
| 2005/0214088 A1 | 9/2005 | Acton | |
| 2012/0219395 A1 | 8/2012 | Naguma et al. | |
| 2013/0280002 A1 * | 10/2013 | Girardin | B60P 3/079 410/7 |

FOREIGN PATENT DOCUMENTS

| | | |
|---|---|---|
| WO | 9202389 A1 | 2/1992 |
| WO | 9922959 A1 | 5/1999 |

\* cited by examiner

WHEELCHAIR SECUREMENT SYSTEM AND DEVICE

CROSS-REFERENCE TO RELATED APPLICATIONS

This application claims priority to and is a continuation of U.S. patent application Ser. No. 15/896,024, filed on Feb. 13, 2018, now U.S. Pat. No. 10,945,897, which is a continuation of U.S. patent application Ser. No. 15/249,265 filed on Aug. 26, 2016 and now abandoned, which is a continuation of U.S. patent application Ser. No. 14/211,934 filed on Mar. 14, 2014, now U.S. Pat. No. 9,445,957, which claims priority to U.S. Provisional Patent Application No. 61/798,914 filed on Mar. 15, 2013. U.S. patent application Ser. Nos. 15/896,024, 15/249,265, 14/211,934, and 61/798,914 are all incorporated herein by reference.

BACKGROUND

Technical Field

The embodiments described and claimed herein relate generally to wheelchair securement methods, systems, and devices for vehicles.

Background Art

Traditionally, two different types of tie-down assemblies (also referred to as tie-downs), have been used to secure a wheelchair inside a vehicle: retractor type tie-downs and manual belt type tie-downs. Both of these types of tie-downs are briefly discussed below, along with their drawbacks.

Retractor type tie-downs are often limited by the strength or material of the restraint being used, and are limited in the way they are currently designed because only one length of the restraint is used when securing the wheelchair. Because of these limitations, the majority of retractors are generally limited to securing a wheelchair having a mass of a 100-120 kg when using two retractors in the rear of the wheelchair. If a wheelchair above these limits is to be secured, three or more retractor tie-downs are required in the rear of the securement area. If the restraint strength is increased, the restraint generally becomes thicker and this means the retractor needs to increase in size to house this restraint (which makes them heavier and more difficult to install or use) or the amount of restraint available is significantly reduced, reducing their reach and limiting their use to very small vehicle installations. In such a scenario, the only way to secure heavy wheelchairs is to use more than two retractors. The disadvantages of using more than two retractors include more clutter on the vehicle floor, which could also result in other passengers tripping over the clutter, additional installation of more tie-downs, which results in more time and cost, improper use of the retractors as it requires drivers or operators to discern when to use multiple retractors on wheelchairs of certain weights, and the arrangement of using more than two retractors is not aesthetically pleasing.

Manual belt type tie-downs are often stronger than the retractor type as the design allows the restraint to be doubled, and as a result they can often secure wheelchairs up to a mass of around 140 kg using two tie-downs in the rear of the location. If a wheelchair above these limits is to be secured, three or more tie-downs are required. Manual tie-downs require more technical operation in order to properly secure a wheelchair as the operator must perform additional steps of adjusting, tightening and locking the restraint, and storing the excess restraint. Tightening of the manual tie-downs require the use of an over-center buckle, ratchet, or similar mechanism which requires two hands and considerable effort, which may, at times, prove to be difficult for many individuals. As such, manual tie-downs are considered more cumbersome to use with the increased risk of improper use, and are, therefore, generally not favored. Further, they are less compact than retractors and take up more storage room. Also, where the vehicle footprint is small and/or the wheelchair tie-down securing locations are low, these tie-downs often need to be very short in length and the minimum length for these systems are inhibited by the buckle or adjuster mechanism from being reduced further in length. When wheelchairs exceeding 140 kg are used, currently three or more tie-downs are required. As noted above, using more tie-downs can lead to increased clutter, misuse, and increased installation costs.

There is a growing concern that wheelchairs are increasing in mass and size, while restraints, tie-downs, and/or securement systems used to secure such wheelchairs have not been properly designed or tested with these larger wheelchairs in mind. For example, some powered wheelchairs can have a mass as high as 200 kilograms (kg), and as a result, standard testing procedures for wheelchair restraints using an 85 kg surrogate wheelchair are not representative of the actual wheelchair masses that may be used in the market.

In addition to the increase in size and mass of wheelchairs in recent years, vehicles are also becoming smaller. As such, the environment and space for securing wheelchairs in these kinds of vehicles is becoming ever more challenging. Personal wheelchair accessible vehicles are often designed to carry one or two wheelchairs, with one sitting behind the other. Fitting the wheelchair into these vehicles often requires the wheelchair to sit on a 10 degree slope, or require that the tie-downs angles used to secure a given wheelchair are set very steep to fit within the space.

To explain by way of an example, standards such as the ISO10542 recommend a maximum rear tie-down angle of 45 degrees. In reality though, the rear tie-down angles are often at 50-55 degrees. This type of geometry can significantly increase the loading in the rear tie-downs, which means that often times, even with a 85 kg wheelchair, current retractor tie-down technology is not suitable or strong enough to work in this environment. The only options available in such a scenario are to revert to a manual belt type tie-down (which are slightly stronger) or modify the vehicle layout which is both time consuming and very costly.

Further, if a heavy wheelchair is to be secured in a small vehicle, then there is often insufficient room to install more than two tie-downs. Often, in these situations the rear tie-downs from the front wheelchair position clash with the front tie-downs from the rear wheelchair positions. This results in either the comfort of the wheelchair passenger being compromised or having to utilize costly vehicle conversions, for example by installing the tie-down retractors under the vehicle floor.

In view of these market changes (e.g., introduction and use of heavier wheelchairs and smaller vehicles), there is an increased demand for tie-downs to be tested with heavier wheelchairs, and a push that standards declare the maximum wheelchair mass that a restraint can secure. An example of such a standard is the UK PAS 2012. When tested to such standard, traditional retractor tie-downs are limited to securing a wheelchair of mass of around 100-120 kg and a belt type tie-down of around 140 kg. If a wheelchair above these limits is to be secured, three or more tie-downs are required in the rear.

Accordingly, there is a need for stronger 'heavy duty' securement systems that can be used to secure heavier wheelchairs in smaller vehicles having limited or challenging installation space, and that be used to reduce the number of tie-down assemblies for securing such wheelchairs.

BRIEF SUMMARY

In a first embodiment, a securement assembly for securing a wheelchair in a vehicle is provided. The securement assembly comprises a retractor secured to the vehicle and a restraint. In the first embodiment, the restraint webbing has one end affixed to and extending from the spool of retractor, has an extendable middle segment slidably passing through an opening of a hook for connecting the webbing and the retractor to the wheelchair, and has an opposite end of the webbing is secured to the vehicle at least near or directly underneath the retractor.

In a second embodiment the securement assembly comprises a retractor, a restraint webbing, and a wheelchair connector. The restraint has a both ends secured to and extending from the spool of retractor, an elongated and extendable middle segment slidably passing through an opening of a hook used to connect the webbing and the retractor to the wheelchair.

Other embodiments are contemplated that could include a combination of the features discussed herein and other features which are known in the art, all of which are contemplated as falling within the claims even if such embodiments are not specifically identified and discussed herein.

BRIEF DESCRIPTION OF THE SEVERAL VIEW OF THE DRAWINGS

These and other features, aspects, objects, and advantages of the embodiments described and claimed herein will become better understood upon consideration of the following detailed description, appended claims, and accompanying drawings where:

Figure 1:
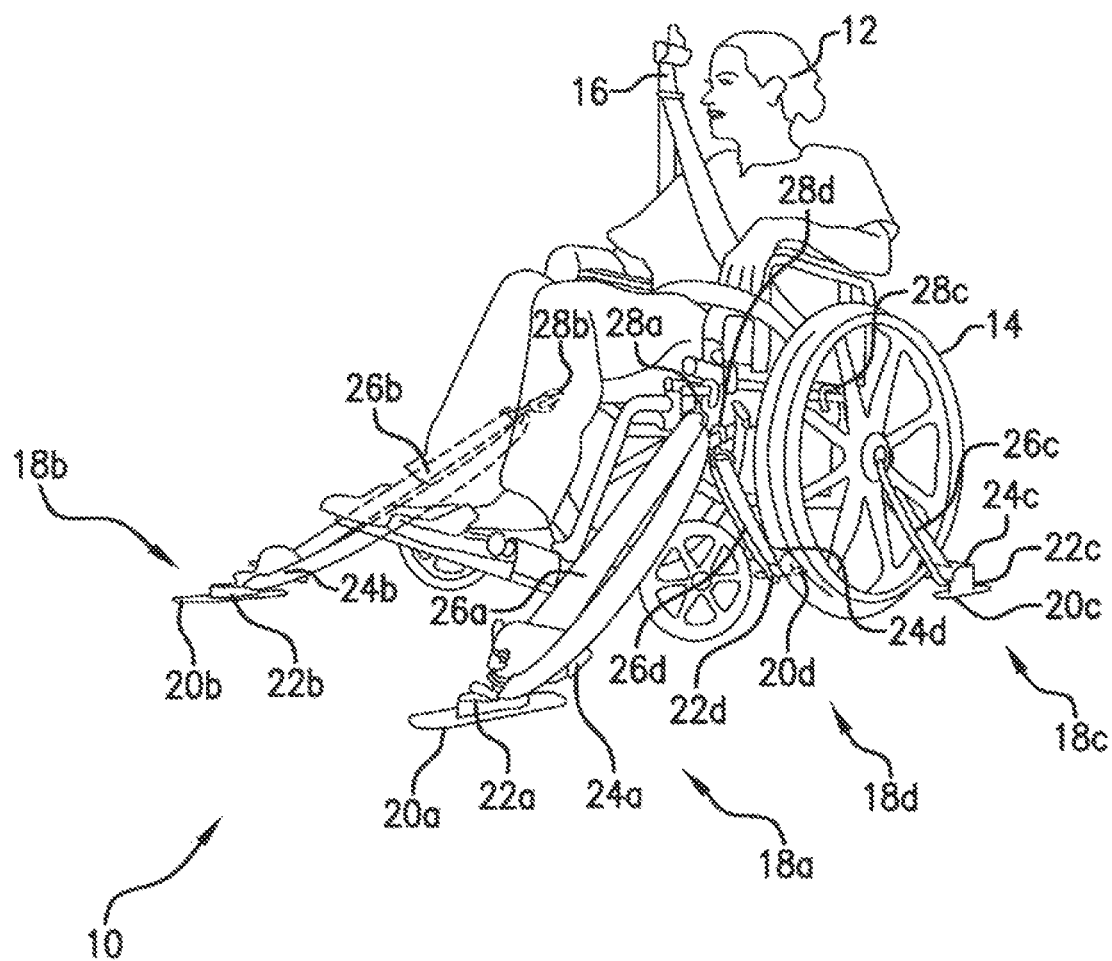
FIG. 1 is a perspective view illustrating a first embodiment of an exemplary securement system used to secure a wheelchair in a vehicle.

It should be understood that the drawings are not necessarily to scale and that the embodiments are sometimes illustrated by graphic symbols, phantom lines, diagrammatic representations and fragmentary views. In certain instances, details which are not necessary for an understanding of the embodiments described and claimed herein or which render other details difficult to perceive may have been omitted. It should be understood, of course, that the inventions described herein are not necessarily limited to the particular embodiments illustrated. Indeed, it is expected that persons of ordinary skill in the art may devise a number of alternative configurations that are similar and equivalent to the embodiments shown and described herein without departing from the spirit and scope of the claims.

Like reference numerals will be used to refer to like or similar parts from Figure to Figure in the following detailed description of the drawings.

DETAILED DESCRIPTION

Referring first to FIG. 1, one embodiment of a wheelchair securement system 10 is shown for securing a wheelchair 14 and its occupant 12 in a vehicle. As shown in FIG. 1, the wheelchair securement system 10 includes an occupant restraint system 16, wheelchair securement assemblies 18a, 18b, 18c, and 18d (or tie-down assemblies 18a, 18b, 18c, and 18d), mounting brackets 20a, 20b, 20c, and 20d, and 22a, 22b, 22c, and 22d. In one embodiment, each wheelchair securement assembly 18a, 18b, 18c, and 18d includes a retractor, a restraint, and a wheelchair connector. As shown in FIG. 1, the securement assembly 18a includes a retractor 24a, a restraint 26a; the securement assembly 18b includes a retractor 24b, and a restraint 26b, and a wheelchair connector 28b; the securement assembly 18c includes a retractor 24c, a restraint 26c, and a wheelchair connector 28c; and the securement assembly 18d includes a retractor 24d, a restraint 26d and a wheelchair connector 28d.

The wheelchair securement system 10 as shown is fully-equipped to secure a wheelchair and its occupant. The system 10 is intended to be disposed in a vehicle such as a bus, car, van, train, aircraft, boat, or the like. The system 10 can be mounted to the vehicle in many different ways and orientations. In one embodiment, the system 10 is mounted to a portion of a floor of the vehicle by way of anchorage in the form of mounting brackets 20a, 20b, 20c, and 20d that are designed to fit at various locations along a floor anchorage such as L-track, A-Track or other floor anchorage integral to or carried by a floor or other support that is designed to carry a wheelchair during transit In another embodiment, the system 10 is mounted to a barrier, backwall, or a sidewall (not shown) in the vehicle by way of mounting brackets 20a, 20b, 20c, and 20d. The system 10 can be oriented in a way that the wheelchair is secured in a forward, rearward, or sideways direction. In addition, the system 10 can include four tie-down assemblies as shown, or three tie-down assemblies, as described in U.S. Pat. No. 8,414,234, which is incorporated herein by reference in its entirety. Even further, the system can include controls for changing the state of one or more of the retractors from an unlocked state to a locked state in the manner similar to that described in U.S. Pat. No. 7,452,170, which is incorporated herein by reference in its entirety.

In operation, each securement assembly 18a, 18b, 18c, and 18d works in conjunction with the other securement assemblies in system 10 to adequately secure the wheelchair 14 to the inside of a vehicle. Generally speaking, securement assemblies 18a, 18b, 18c, and 18d each operate in a secured configuration or in an unsecured configuration. FIG. 1 illustrates the wheelchair 14 in the secured configuration. In the secured configuration, each securement assembly 18a, 18b, 18c, and 18d is connected to a portion of the wheelchair 14 such that each securement assembly secures, in part, a portion of the wheelchair to the vehicle. In the secured configuration, as shown, each wheelchair connector 28a, 28b, 28c, and 28d is adapted to connect its respective restraint 26a, 26b, 26c, and 26d to a corresponding frame member of wheelchair 14. Each restraint 26a, 26b, 26c, and 26d first extends from its respective retractor 24a, 24b, 24c, and 24d to a corresponding wheelchair connector, loops around or loops through its respective wheelchair connector, and then extends back towards its respective retractor. Each retractor 24a, 24b, 24c, and 24d, in turn, is connected to its respective mounting bracket 20a, 20b, 20c, and 20d via anchors 22a, 22b, 22c, and 22d. And each mounting bracket 20a, 20b, 20c, and 20d is adapted to mount its respective securement assembly 18a, 18b, 18c, and 18d to an inside surface of the vehicle.

Each component shown in FIG. 1 is discussed in detail below. It should be understood that while the discussion below expressly refers to the wheelchair connector 28a, the securement assembly 18a, the restraint 26a, the retractor 24a, the anchor 22a, and the mounting bracket 20a, the discussion below is also applicable to each of wheelchair connectors 28b, 28c, and 28d, securement assemblies 18b, 18c, and 18d, restraints 26b, 26c, and 26d, retractors 24b, 24c, and 24d, anchors 22b, 22c, and 22d, and mounting brackets 20b, 20c, and 20d.

Wheelchair connector 28a may be any of a variety of connectors adapted to connect a portion of the restraint webbing 26a to a portion of the wheelchair 14. In one embodiment, the wheelchair connector 28a is a universal fastener or anchor wherein one end of the fastener is configured to connect to most types of wheelchairs and the other end of the fastener connects to the restraint 26a. For example, the wheelchair connector 28a may be an S-hook or a J-hook fastener. In another embodiment, the wheelchair connector 28a is simply a portion of the restraint webbing 26a that loops around a frame member of the wheelchair. In this embodiment, the restraint webbing 26a would have a connector at its terminal end that would connect at, near, or to the retractor 24a. That connector could be a male tongue that would mate with a female buckle near, at, or on the retractor 24a.

Generally speaking, restraint webbing 26a (like each of restraints 26b, 26c, and 26d) is any type of restraint that extends away from a retractor to a wheelchair connector, loops around the portion of the wheelchair connector, and then extends back towards its respective retractor. In one embodiment, the restraint webbing 26a is a webbing or a strap that is housed within the retractor 24a that is adapted to pass through an opening in the retractor 24a, and that extends away from the retractor 24a to the wheelchair connector 28a, loops around a portion of the wheelchair connector 28a, and the extends back towards the retractor 24a. In this embodiment, the restraint material is webbing or strap. In another embodiment, the restraint can be rope, cord, or cable.

As a general matter, retractor 24a (like each of retractors 24b, 24c, and 24d) comprises a housing that defines an interior space in which a restraint is housed, and includes an opening through which a portion of the restraint 26 passes or extends. In one embodiment, the retractor 24a includes a retractor spool disposed within the housing, wherein the restraint is wound on the retractor spool, wherein a portion of the restraint is adapted to pass from the retractor spool through the opening. The retractor 24a may be any retractor, including Q'straint's QRTMAX, QRT Delux, QRT Standard, or QER-4000 retractor products.

Anchor 22a (like each of anchors 22b, 22c, and 22d) may be generally any type of fastener or anchor that allows a securement system and/or a retractor to be connected to a mounting bracket or to the inside surface of a vehicle. In the embodiment of FIG. 1, the anchor 22a is a slide and click disk shaped anchor for use in "L-Track" system that that has extended length (not shown), and allow the retractor to connect to a mounting bracket 20a at various locations along the length of the "L-Track". The anchor may be a bolt, a screw or other form of connection.

Mounting brackets 20a (like each of mounting brackets 20b, 20c, and 20d) allows a securement system (e.g., securement system 18a) to be installed to a vehicle. In FIG. 1, mounting bracket 20a is an "L-track" that is flush mounted to the floor of vehicle. In another embodiment, mounting bracket may a surface rail track for surface mounted installations. In yet another embodiment, mounting bracket may be bracket that allows securement system 18a to be installed on a barrier, seating module, or sidewall of the vehicle. Other embodiments are also possible.

It should be understood that the system 10 illustrated in FIG. 1 is exemplary in nature. As such, system 10 may not necessarily include the occupant shoulder restraint system 16, and may include other components or features not shown. For instance, in one embodiment, securement assemblies 18a, 18b, 18c, and 18d connect directly to the inside of the vehicle without first connecting to mounting brackets 20a, 20b, 20c, and 20d. As another example, in one embodiment, wheelchair connector 28a is part of the securement assembly 18a, whereby the restraint webbing 26a itself connects to the wheelchair. As yet another example, in one embodiment, system 10 may include only two or three of the four securement assemblies 18a, 18b, 18c, and 18d shown in FIG. 1.

Figure 2:
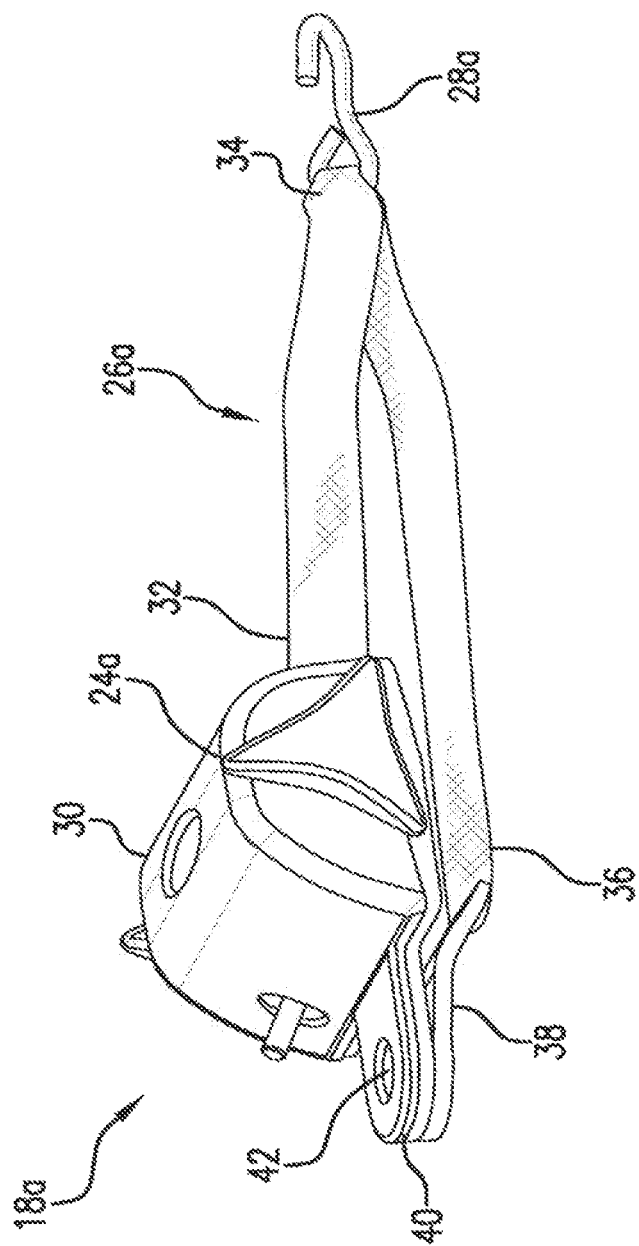
FIG. 2 is a perspective view illustrating a first embodiment of a securement assembly in the securement system.

FIG. 2 illustrates a perspective view of the exemplary securement assembly 18a from FIG. 1. As shown in FIG. 2, the securement assembly 18a includes the retractor 24a, the restraint webbing 26a, and a restraint 38, each of which is discussed in turn below. While the preferred (and commonly used) material for the restraint is webbing, other flexible material may be used, such as cable, rope and any other flexible and elongate material.

Retractor 24a comprises a housing 30. The housing 30 defines an interior space in which a restraint is housed, and includes an opening (not shown in FIG. 2) through which the restraint passes as it winds on an off a spool inside the housing 30 of the retractor 24a. As shown in FIG. 2, the housing 30 includes a laterally extending tongue 40 which includes a hole 42 through which an anchor 22a can be affixed thereby allowing the retractor 24a to be mounted to the mounting bracket 20a (shown in FIG. 1) or an inside surface of the vehicle.

Restraint webbing 26a generally is adapted to form a closed loop around a portion of the wheelchair connector 28a. As discussed below in connection with FIGS. 4 and 5, wheelchair connector 28a is any type of connector that it adapted to connect to a portion of the wheelchair 14. As shown in FIG. 2, in the secured configuration, the restraint webbing 26a extends from the retractor 24a towards the wheelchair connector 28a, loops around a portion of the wheelchair connector 28a, and then extends back towards the retractor 24a, thereby forming a closed loop around a portion of the wheelchair connector. This arrangement of having the restraint webbing 26a extend from the retractor 24a, loop around and extend back towards the retractor 24a has several advantages, some of which are discussed below.

First, the closed loop arrangement advantageously increases the strength of the securement assembly 18a to enable heavy wheelchairs, such as powered wheelchairs, to be secured or wheelchairs to be secured in a challenging environment without having to redesign the wheelchair installation space. In particular, the closed loop arrangement increases the retractor effective strength by doubling the restraint webbing 26a between a wheel chair and a vehicle, while maintaining the core functionality of the retractor 24*a*—such as its size, self tensioning etc.

The closed-loop arrangement is different from a tongue and buckle restraint that is typically used in prior art manual belt type tie-downs because a tongue and buckle loop does not increase the capacity of a retractor—it merely acts as a securement hook. Second, the closed-loop arrangement minimizes the clutter on the vehicle floor compared to the prior art 4 tie-downs or 2 manual belt tie-downs which are traditionally needed to secure heavier wheelchair. Third, the closed-loop arrangement increases the speed of installation compared to the installation of 4 tie-downs or installation of 2 manual belt-tie downs, and reduces the amount of floor anchorages required in the vehicle floor compared to 4 tie-downs. Fourth, the closed-loop arrangement minimizes the likelihood of misusing securement assembly 18*a* given that restraint webbing 26*a* can be used to secure heavier wheelchairs. Fifth, the overall dimensions of the restraint webbing 26*a* are maintained and hence no increased amount of space within the vehicle is required. This is a significant advantage as installation space is becoming limited as vehicles are getting smaller. Sixth, in one embodiment, the securement assemblies are used on the rear for all wheelchair weights up to the retractor limit. As such, the securement assemblies described herein are advantageously used where steep rear tie-down angles or vehicle floor angles exist given that these angled arrangements often increase the load in the tie-downs or restraints beyond their capability.

Returning to FIG. 2, the restraint webbing 26*a* includes a first end 32 affixed to the spool of the retractor 30, an extendable middle segment 34, and an opposite end 36, which, preferably, is attached to the structure in which the wheelchair is to be secured at the same location as the tongue 40 retractor 24*a*. As shown in FIG. 2, the first end 32 is connected to the extendable middle segment 34, which in turn is connected to the opposite end 36. In a secured configuration of the securement assembly 18*a*, the restraint webbing 26*a* at least in part forms a closed loop extending through an opening in the wheelchair connector 28*a*. As shown in FIG. 2, the loop begins at first end 32 and extends to the opposite end 36.

As a general matter, the first end 32 comprises a portion of the restraint webbing 26*a* that is generally disposed inside the retractor 26*a* and is fixed to a spool (not shown) therein. The extendable middle segment 34 generally comprises a portion of the restraint webbing 26*a* that is adapted to loop through an opening in the wheelchair connector 28*a*. The opposite end 36 generally comprises a portion of the restraint webbing 26*a* that is disposed at the point of connection of the retractor 24*a* to the vehicle. This arrangement takes advantage of the same connecting hardware used fasten both the retractor 24*a* and the opposite end 36 of the webbing.

The terminal segment 36 could, alternatively be connected to a portion of the outside surface of the housing 30. In yet another embodiment, the terminal segment 36 could be connected to a portion on an inside surface of the housing 30. In still yet another embodiment, the opposite end 36 may be connected to the restraint, near but at a location that is different from the location where the retractor 24*a* is fastened to the structure to which the wheelchair is being secured.

Restraint connector 38 is any type of connector or anchor that is capable of forming a connection between to the opposite end 36 of the restraint 26*a* and the structure to which the wheelchair is being secured. As shown in FIG. 2, the restraint connector 38 forms a tongue that is aligned with the tongue 40 of housing 30. In this embodiment, the anchor 22*a* can be used to anchor both the opposite end 36 and the tongue 40 to the mounting bracket 20*a*. It should be understood that connector 38 may take many different forms. For example, in one embodiment, the restraint connector may comprises a female portion of a buckle and the opposite end may carry a male portion of the buckle such that the male and female portions mate, whereby the restraint webbing form an openable loop. As another example, in one embodiment, the restraint connector 38 is integrally attached to a part (such as the housing 30) of the retractor 24*a*.

It should be understood that the securement assembly 18*a* in FIG. 2 is exemplary in nature, and may include other components, and may be configured in different ways. For example, securement assembly may not include a restraint connector 38, such that the opposite end 36 is adapted to attach to a surface that is located near but separate from the location where the retractor 24*a* is connected to the structure to which the wheelchair is being secured.

Figure 3:
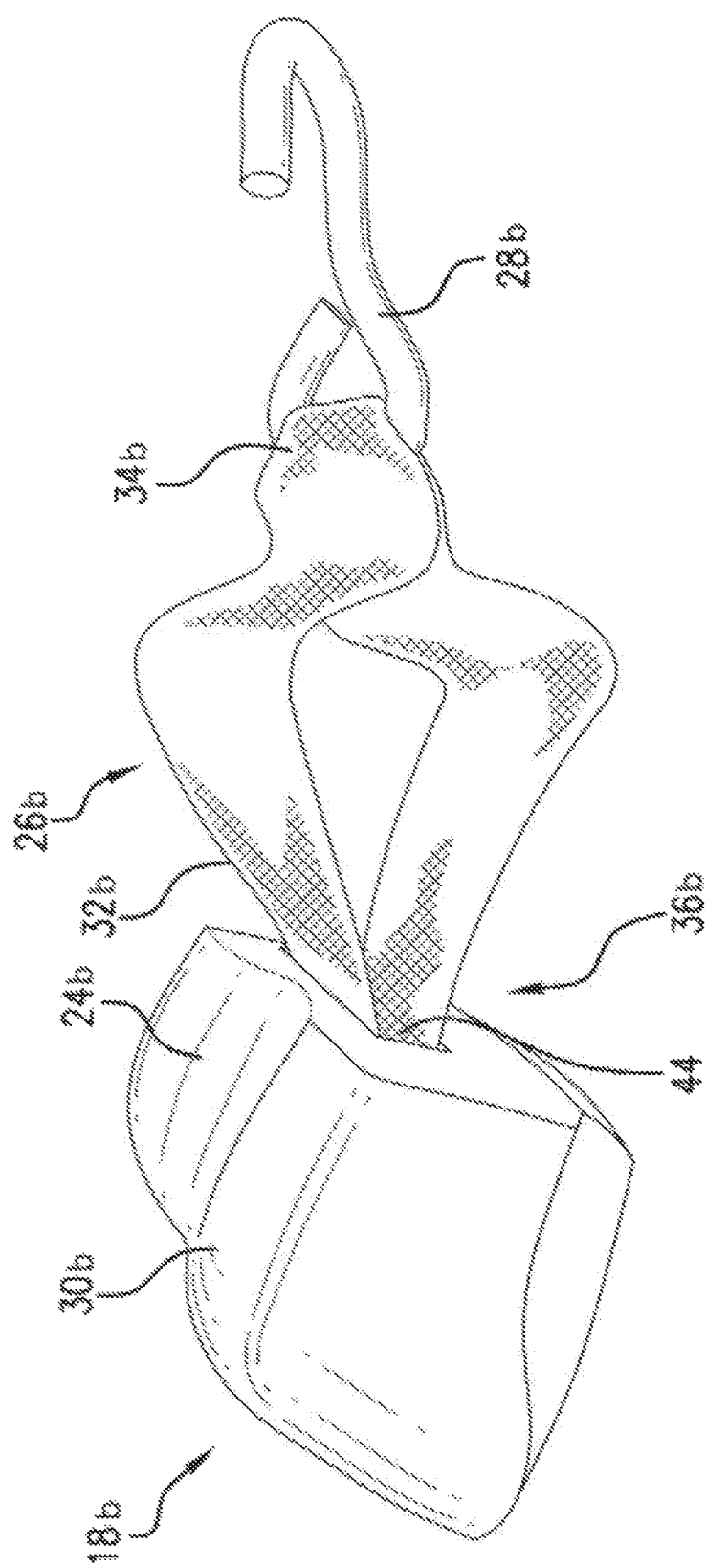
FIG. 3 is a perspective view illustrating a second embodiment of the securement assembly.

FIG. 3 illustrates a perspective view of another embodiment of securement assembly 18*b*. In this embodiment, both ends (not shown) of the restraint webbing 26*b* pass through the opening 44 in the retractor housing 30*b*, and the webbing 26*b* also passes through an opening in the wheelchair connector 28*b*, such two parts of the extendable middle segment extend from the housing 30*b*. In this embodiment the opposite end 36 may be affixed through an inside surface of the housing to the tongue by which the housing is affixed to the anchor. In an alternative version, similar to FIG. 3, the opposite end 36*b* may be affixed to the spool (not shown), in which case the amount of length of the webbing that passes through the opening of the hook 28*b* would be relatively small, i.e., only enough to account for the differing rates taken up by winding both ends of the webbing around the same spool in the retractor.

Figure 4:
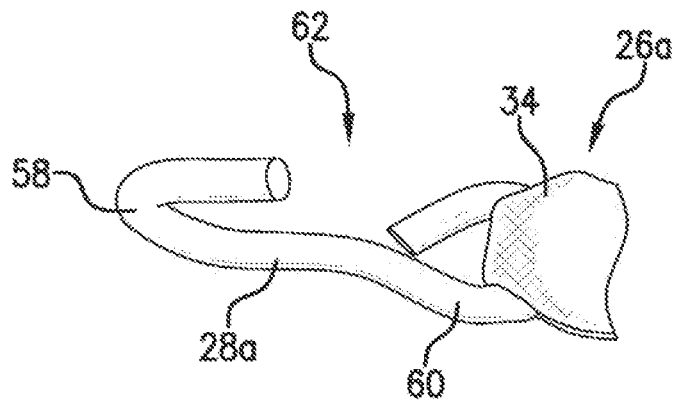
FIG. 4 is a perspective view illustrating a first embodiment of a wheelchair connector; and, FIG. 5 is a perspective view of a bearing surface for the wheelchair connector shown in FIG. 4.
Figure 5:
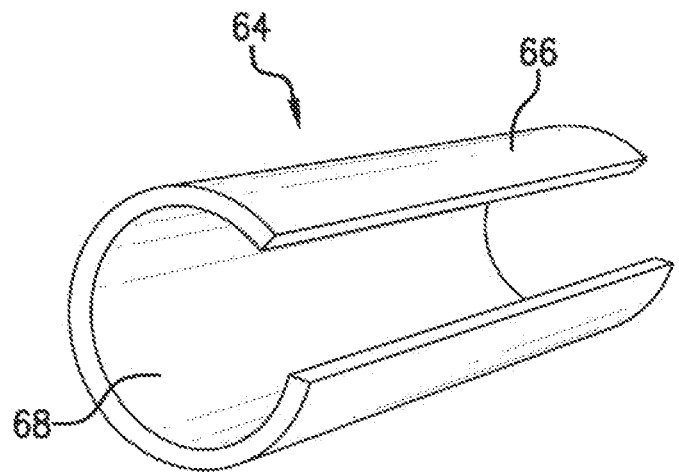

FIG. 4 depicts one possible embodiment of a wheelchair connector 28*a*. The wheelchair connector 28*a* comprises a J-hook 62 having a first end 58 and a second end 60. As shown, the extendable middle segment 34 of the restraint webbing 26*a* is adapted to pass through an opening in the second end 60 of the wheelchair connector 28*a*. To reduce webbing friction between the wheelchair connector 28*a* and the distal segment 34 of the restraint 26*a*, a sleeve bearing (FIG. 5) can be place on the second end 60 of the wheelchair connector 28*a*. The clip 64 of FIG. 5 is one example of such a bearing. The clip 64 comprises a C-shaped clip that includes a curved outside surface 66 and a curved inside surface 68 to fit loosely around the bent wire that forms the second end 60 of the connector 28*a*. The inside surface 68 of the clip 64 is adapted to connect to the second end 60 of the hook 62 shown in FIG. 4. The clip 64 is adapted to rotate freely around the second end 60 of the hook 62 such that the inside surface 68 comprises a bearing surface that allows the clip 64 to rotate freely. In another embodiment, the clip 64 is attached fixedly to the second end 60 of the hook 62 such that the outside surface 66 acts as the bearing surface for the restraint webbing 26*a*. As webbing may tend to fray, placement of a low-friction material or a sleeve bearing on the connector at the opening will enhance the life of the webbing that passes through the opening in the connector 28*a*, each time the restraint is used.

It should be noted that the connector shown and described herein is a J-hook, it should be noted that many different connector may be used, including a variety of other hooks or multi-component assemblies, so long as they safely and quickly connect the restraint to as structural component of the wheelchair to be secured. Possible alternative connectors include: S-hooks, Caribiner-hooks, Wire-hooks, Narrow Hooks and male-female buckles, and many others. Similarly, while the restraint shown herein is the usual fabric-based webbing (as is commonly seen in seat belts, but perhaps heavier), other tension-carrying materials are suitable, and include cable, wire, synthetic line and rope.

Although the inventions described and claimed herein have been described in considerable detail with reference to certain embodiments, one skilled in the art will appreciate that the inventions described and claimed herein can be practiced by other than those embodiments, which have been presented for purposes of illustration and not of limitation. For example, the embodiments shown herein include webbing as the flexible restraint material, which is commonly used in vehicle restraint systems, but this is only exemplary, and those skilled in the art will be aware that other flexible restraining materials may be used. Therefore, the spirit and scope of the appended claims should not be limited to the description of the embodiments contained herein.

We claim:

1. A mobility aid tie-down for securing a mobility aid during transit in a vehicle, the mobility aid tie-down comprising: a retractor secured to the vehicle at a first anchor point; the retractor having a spool and a restraint extendable therefrom; the restraint having a first restraint segment extending from the spool to a securement point on the mobility aid and a second restraint segment extending from the securement point on the mobility aid to a second anchor point; whereby the mobility aid tie-down is configured to distribute a load from the mobility aid during an adverse driving event between the first restraint segment and the second restraint segment; wherein both the spool and the second anchor point are disposed within a housing.

2. The mobility aid tie-down of claim 1, the retractor being self-tensioning.

3. The mobility aid tie-down of claim 2, wherein the load is distributed between the first anchor point and the second anchor point.

4. A mobility aid tie-down for securing a mobility aid during transit in a vehicle, the mobility aid tie-down comprising: a retractor secured to the vehicle at a first anchor point; the retractor having a spool and a restraint extendable therefrom; the restraint having a first restraint segment extending from the spool to a securement point on the mobility aid and a second restraint segment extending from the securement point on the mobility aid to a second anchor point; whereby the mobility aid tie-down is configured to distribute a load from the mobility aid during an adverse driving event between the first restraint segment and the second restraint segment; wherein the second anchor point is the spool, whereby a portion of both the first restraint segment and the second restraint segment are wound about the spool.

5. The mobility aid tie-down of claim 2, wherein the first restraint segment and the second restraint segment are continuous.

6. The mobility aid tie-down of claim 2, wherein the mobility aid is oriented in a rearward-facing direction relative to a vehicle traveling direction.

7. The mobility aid tie-down of claim 2, wherein the mobility aid is oriented in a forward-facing direction relative to a vehicle traveling direction.

8. The mobility aid tie-down of claim 2, wherein the mobility aid is oriented in a side-facing direction relative to a vehicle traveling direction.

9. The mobility aid tie-down of claim 1, wherein both the first restraint segment and the second restraint segment extend through a same opening in the housing.

10. The mobility aid tie-down of claim 9, wherein the second anchor point is the spool, whereby a portion of both the first restraint segment and the second restraint segment are wound about the spool.

11. The mobility aid tie-down of claim 2, wherein the restraint comprises a material selected from the group including webbing, rope, cord, and cable.

12. The mobility aid tie-down of claim 2 further comprising a mobility aid connector securing a middle portion of the restraint to the securement point on the mobility aid, wherein the middle portion of the restraint extends through an opening in the mobility aid connector.

* * * * *